US007481399B2

(12) United States Patent
Nöhren et al.

(10) Patent No.: US 7,481,399 B2
(45) Date of Patent: Jan. 27, 2009

(54) POSITION SECURING SYSTEM FOR RESTRAINING AN OCCUPANT IN LAND AND AERONAUTICAL VEHICLES

(75) Inventors: Hubert Nöhren, Hamburg (DE); Carl-Jürgen Schroth, Arnsberg (DE); Stefan Meier-Arndt, Kamen (DE)

(73) Assignee: Schroth Safety Products GmbH, Arnsberg (DE)

( * ) Notice: Subject to any disclaimer, the term of this patent is extended or adjusted under 35 U.S.C. 154(b) by 204 days.

(21) Appl. No.: 11/288,043

(22) Filed: Nov. 28, 2005

(65) Prior Publication Data

US 2006/0131457 A1 Jun. 22, 2006

Related U.S. Application Data

(63) Continuation of application No. PCT/DE2004/001798, filed on Aug. 11, 2004.

(30) Foreign Application Priority Data

Aug. 29, 2003 (DE) ................................. 103 40 237

(51) Int. Cl.
*B64D 11/06* (2006.01)
(52) U.S. Cl. .............................. 244/122 R; 244/122 B; 182/231; 182/232; 180/268; 280/807; 280/808
(58) Field of Classification Search ............ 244/122 R, 244/122 B; 182/231, 232; 280/801.1, 806, 280/807, 808; 180/268
See application file for complete search history.

(56) References Cited

U.S. PATENT DOCUMENTS 2,708,555 A 5/1955 Mayo et al.

(Continued)

FOREIGN PATENT DOCUMENTS

EP 1 245 487 10/2002

*Primary Examiner*—J. Woodrow Eldred
(74) *Attorney, Agent, or Firm*—Henry M. Feiereisen; Ursula B. Day

(57) ABSTRACT

A position securing system for restraining an occupant in a vehicle includes a harness placed about an occupant's body and including a two-part lap belt defining two lap belt straps, two leg loops, a rear belt, two shoulder belts, a back belt, and a belly-side center buckle. Anchored to the vehicle and interacting with the lap belt straps are a plurality of retractors connectable to the vehicle and interacting with the shoulder belts and the belt straps of the lap belt in one-to-one correspondence, wherein at least the retractors interacting with the lap belt straps are each constructed to include a winding drum for winding in a reel-in direction a traction member which is integrated in the lap belt strap, with the winding drum loaded by a spring in the reel-in direction. Rotation of the winding drum at least in a pay-out direction of the traction member is automatically blocked by a locking mechanism, when the occupant assumes the seated position. The blocked position of the winding drum can be released via a hand-operated control mechanism so that the occupant is able to move between seated and standing positions. A pay-out lock is operatively connected to the winding drum and constructed to act upon the winding drum in response to a sensed acceleration of the occupant, wherein the winding drum so interacts with the control mechanism and the pay-out lock as to be either securable in place by the control mechanism or acted upon by the pay-out lock, when the occupant assumes the standing position.

13 Claims, 3 Drawing Sheets

U.S. PATENT DOCUMENTS 5,544,363 A    8/1996   McCue et al.

7,025,298 B2 *  4/2006  Priest et al. .............. 242/388.8

* cited by examiner

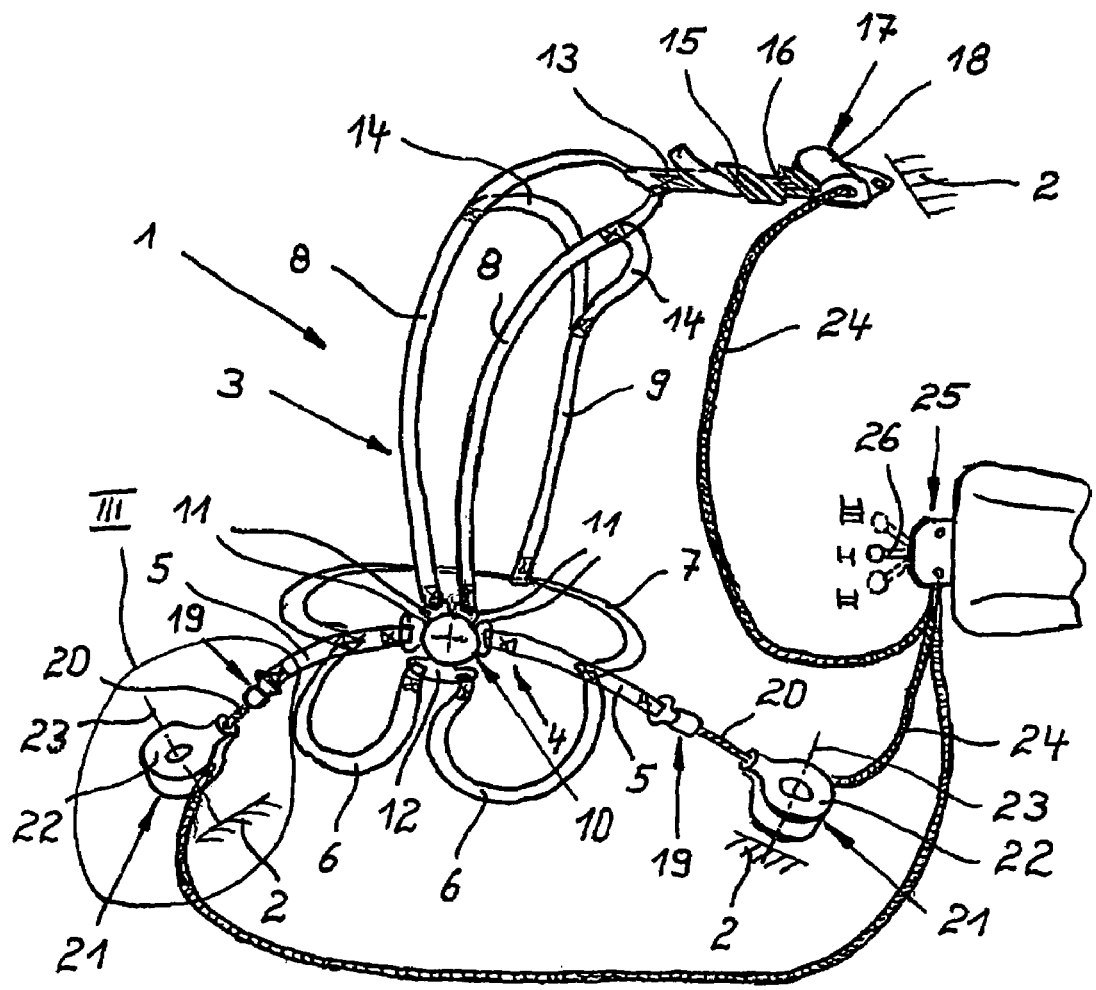
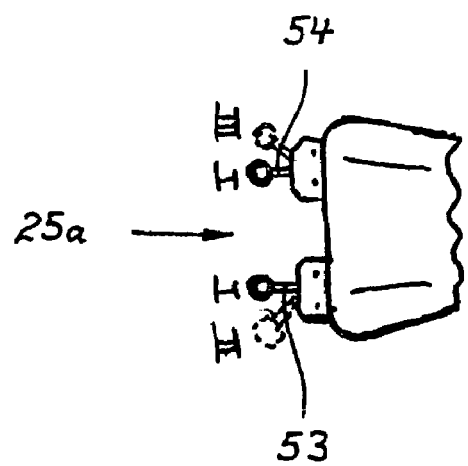
Fig. 1
Fig. 2

POSITION SECURING SYSTEM FOR RESTRAINING AN OCCUPANT IN LAND AND AERONAUTICAL VEHICLES

CROSS-REFERENCES TO RELATED APPLICATIONS

This application is a continuation of prior filed copending PCT International application no. PCT/DE2004/001798, filed Aug. 11, 2004, which designated the United States and on which priority is claimed under 35 U.S.C. §120, and which claims the priority of German Patent Application, Ser. No. 103 40 237.3, filed Aug. 29, 2003, pursuant to 35 U.S.C. 119(a)-(d), the subject matter of which is/are incorporated herein by reference.

BACKGROUND OF THE INVENTION

The present invention relates to a position securing system for restraining an occupant in a land vehicle or aeronautical vehicle in the seated and standing positions and during shift between the seated and standing positions.

Nothing in the following discussion of the state of the art is to be construed as an admission of prior art.

Land vehicles or aircrafts, in particular those used for rescue and transport of injured people, like ambulances or rescue helicopters, require an occupant in certain situations to carry out various activities in seated position as well as standing position, whereby in either position, the occupant should be secured for his or her own safety as well as in the interest of the injured. The same is true during a switch from seated to standing position, or vice versa, so as to prevent endangering the occupant, e.g. when a land vehicle abruptly slows down or an aircraft makes a sudden change in flight direction. Harnesses used for all these situations should hereby not only restrain the occupant but also allow the occupant to carry out the intended activity.

Harnesses typically include a two-part lap belt, two leg loops, a rear belt, two shoulder belts, a back belt, and a belly-side center buckle. Retractors, called "Emergency Locking Retractors" (ELR), are used for the lap belts and shoulder belts to lock the belts, when the vehicle or occupant slows or stops abruptly. The combination of harness and retractors for a position securing system is generally referred to in the concerned art as "High Mobility Restraint" (HMR). Conventional retractors have a sensor mechanism to recognize an acceleration of the belts, when encountering a sudden movement of the vehicle and to ultimately lock so as to prevent a further unwinding of the belts. As a result of this sequence of steps, the so-called "film spool effect" is caused by which the helically wound belts are inadvertently lengthened and no longer rest snugly about the occupant. As a result, the occupant is exposed essentially unprotected to sudden decelerations and accelerations. This is especially true for the lap belts which are especially subject to intense loads in view of the mass distribution of a human body during abrupt movement of a vehicle and resultant significant deceleration or acceleration. Such high loads cause the belts to lengthen, resulting in unacceptable shift of the pelvis area of the occupant.

The use of a so-called "Automatic Locking retractor" (ALR) is also known which lock to maintain a fixed belt length during use but are unsuitable for a High Mobility Restraint because the retractor has to be released, when the occupant is seated. This is unacceptable for safety reasons.

Retractors are generally constructed to spirally wind-up and store the belts. In view of the limited pull-back force of volute springs provided in the retractors and the inherent stiffness of the belts as well as their non-compact structure and surface, the belts cannot be wound in the retractors in an optimum way. A taut winding from layer to layer can be realized only, when the axis of the winding drum is locked and a pull force is applied on the belt. As a result, not only does the diameter of the wound belt decline but also the overall length of the stored belt. As a result, a longer belt strap is released from the retractor.

In aeronautical vehicles, the use of an emergency locking retractor, which reacts in response to a pull-out of a belt from the retractor, is prohibited at least in connection with lap belts because rough flight movements could cause an occupant's body to shift relative to the seat, without exceeding response values of such an emergency locking retractor. Thus, a secure restraint of the occupant in the seat cannot be assured.

It would therefore be desirable and advantageous to provide an improved position securing system to obviate prior art shortcomings and to allow an occupant to carry out all required movements in seated and standing positions as well as during shift between the seated and standing positions, while still reliably restrain the occupant to meet stringent demands.

SUMMARY OF THE INVENTION

According to one aspect of the present invention, a position securing system for restraining in a land or aeronautical vehicle an occupant who alternates between seated and standing positions, includes a harness attached to an occupant's body and including a two-part lap belt defining two lap belt straps, two leg loops, a rear belt, two shoulder belts, a back belt, and a belly-side center buckle, and a plurality of retractors connectable to the vehicle and interacting with the shoulder belts and the belt straps of the lap belt in one-to-one correspondence, wherein at least the retractors interacting with the lap belt straps are each constructed to include a winding drum for winding in a reel-in direction a traction member which is integrated in the lap belt strap, said winding drum being loaded by a spring in the reel-in direction, a locking mechanism for barring rotation of the winding drum at least in a pay-out direction of the traction member, when the occupant assumes a seated position, a hand-operated control mechanism for disengaging the locking mechanism to allow the winding drum to freely rotate so that the occupant is able to move between the seated and standing positions, a pay-out lock operatively connected to the winding drum and constructed to act upon the winding drum in response to a sensed acceleration above a predefined level, wherein the control mechanism and the pay-out lock are so operatively connected to the winding drum that the winding drum is lockable in position by either the control mechanism or by the pay-out lock, when the occupant assumes the standing position.

The present invention resolves prior art problems by constructing the lap belt of the harness in such a way that a seated occupant is secured in place at least by the lap belt straps such that the rotatability of the respective winding drums in the spring-biased retractors are locked to inhibit unwinding of the traction members. In other words, the occupant's pelvis is held firmly against the seat. Still, the occupant is able to move the upper body and thus also the arms, when the shoulder belts are secured to the vehicle via at least one emergency locking belt, designed with belt-sensitive or vehicle-sensitive sensor. A retractor which permanently locks while the occupant is seated assumes thus the function of an automatic locking retractor and secures the occupant, without requiring the provision of a sensor mechanism or a mechanism to respond to certain deceleration or acceleration values of a vehicle. As a result, the conditions are met for approval in the field of aviation.

The retractors respectively coupled to the lap belt straps can thus be configured to prevent the harmful film spool effect.

According to another feature of the present invention, the traction member may be helically wrapped about the winding drum. The traction member may hereby be the end of the lap belt strap, although the traction member may be integrated in the lap belt strap in any suitable manner, including a configuration that deviates from the lap belt strap. Suitably, the traction member may be constructed as cable, chain or toothed belt, with the winding drum having a helical groove for receiving the traction member. In contrast to a spiral-shaped winding of the traction member, a helical winding of the traction member has the advantage of eliminating the need for a separate belt clamping device. Currently preferred is the configuration of the traction member as cable, e.g. a steel cable or textile cable. Suitably, the helical groove of the winding drum has a rounded cross section to conform to the helical configuration of the cable. Of course, when using a chain or toothed belt as traction member, the surface of the winding drum is configured to conform to this type of traction member.

When the seated occupant intends to stand up to carry out activities, the occupant manually operates the control mechanism to unlock the retractors of the lap belt and thus to disengage the winding drums. This may be implemented using electric, pneumatic, hydraulic or mechanical energy. While the occupant changes from the seated position to the standing position, the pay-out lock, constructed with acceleration sensor technology, remains activated in the retractors and is rendered operative as soon as a sudden deceleration or acceleration of the vehicle is registered that affects the balance of the occupant. As a result, the pay-out lock locks the retractor so that the harness securely restrains the occupant in whatever position the occupant has assumed. Once the excessive deceleration or acceleration is over, the occupant is able to shift from one position to the other position so long as the control mechanism is still active and disengages the winding drum.

The control mechanism can be constructed so as to reliably secure a standing occupant, for example when standing near an open door of a helicopter, by locking all retractors of the harness. It may also be conceivable to lock only the lap belt straps, when the occupant stands, whereas the retractors of the shoulder belts continue to operate in emergency locking mode.

As the occupant shifts from the standing position to the seated position, the belts are automatically reeled into the retractors. Shortly before reaching the seated position, the control mechanism switches spontaneously the retractors of the lap belt straps to operate in automatic locking mode. As a consequence, the occupant is now able to move only in the direction of the seated position, while the lap belt is continuously held firmly against the occupant's body and thus ensures his or her safety just like a static lap belt.

A position securing system according to the invention for an occupant in a land or aeronautical vehicle is thus able to reliably retrain the occupant, to continuously ensure the occupant to maintain balance, and to allow the occupant to carry out activities in seated as well as standing positions, e.g. rescue missions, dispatching loads etc.

According to another feature of the present invention, the pay-out lock of each retractor may include at least one toothed disk or ratchet which is operatively connected to the winding drum and interacts with a detent pawl of the locking mechanism, whereby the detent pawl is swingably supported by a housing of the retractor in opposition to a return force of a spring. Suitably, the winding drum is provided on both sides with a ratchet, in which case the detent pawl interacts with both ratchets. Once the return force of the spring is overcome, the detent pawl can detach from the ratchets to release the winding drum.

According to another feature of the present invention, a pull member may be provided to connect the detent pawl to the control mechanism. An example of such a pull member is a Bowden cable.

According to another feature of the present invention, the pay-out lock may include a toothed control ring, a locking pawl disposed inside the control ring and rotating conjointly with the winding drum, and an inertial mass constructed to act upon the locking pawl, wherein the detent pawl is constructed with a return lever which is operatively connected via the locking pawl with the control ring in response to an interaction between the inertial mass and the locking pawl, when the traction member is accelerated above a predefined level. This construction of the retractor provides for an instant locking of the freely rotating winding drum and prevents a further unwinding of the traction member from the winding drum, when the vehicle suddenly decelerates or accelerates. Suitably, the control ring has an inner toothing. The interaction between the inertial mass and the locking pawl may be realized by providing the inertial mass with a control pin by which the locking pawl is urged into the inner teeth of the control ring. As a result, further relative rotation is prevented and at the same time the detent pawl engages the ratchet.

According to another feature of the present invention, the control ring may include an engagement fork for embracing the return lever. This ensures a reliable interaction between the return lever of the detent pawl and the control ring, and the engagement fork is rendered operative already after undergoing a short pivot motion to rotate the return lever and to thereby engage the detent pawl with the ratchet or ratchets.

According to another feature of the present invention, a tracer pin may be arranged in an area of a last turn of the traction member on the winding drum for acting on the detent pawl via a lever assembly. In other words, once the traction member is almost fully wound onto the winding drum, the traction member pushes the tracer pin to cause the detent pawl to engage the ratchet via the lever assembly. As a consequence, the remainder of the traction member can be reeled in but the traction member can no longer be drawn out.

According to another feature of the present invention, the control mechanism may have a hand lever which is shiftable into three positions and connected by a Bowden cable to the pay-out lock. The control mechanism is thus situated in the area of activity of the occupant to be restrained so as to allow the occupant to have easy access for operation. In mid-position, the hand lever is in neutral, i.e. the retractor operates in automatic locking mode. When shifting the hand lever from neutral in one direction to the release position, the winding drum in the retractor becomes disengaged to allow the occupant to move between the seated and standing positions. Shift of the hand lever in the opposite direction from neutral results in an activation of the locking function of the winding drum. This may be the case, when the occupant stands, for example, near an open door of a helicopter for carrying out certain activities. The control mechanism may hereby be so constructed, that the hand lever, when shifted from neutral to the release position, is biased to automatically seek the neutral position, when the occupant lets go of the hand lever. Return of the hand lever from the locking position to the neutral position requires however an active intervention by the occupant.

As an alternative, the control mechanism may have two hand levers, each being shiftable between two operating modes and connected by a Bowden cable to the pay-out lock. For example, a first hand lever is configured that in normal mode, the winding drums are locked, when the occupant is seated, and the sensor function is activated, when the occupant stands. A second hand lever is configured in similar fashion, that in normal mode, the winding drums are also locked, when the occupant is seated, while the sensor function is activated, when the occupant stands. Shifting the first hand lever to the other operating mode causes a disengagement of the winding drum to allow the occupant to stand up, while the second hand lever remains in normal mode. When, however, the second hand lever is shifted from normal mode to the other operating mode, the winding drum is locked, regardless whether the occupant sits or stands.

When using a position securing system according to the invention for persons that attend to the injured and to the transport, there is a risk that blood contaminates the harness. Contaminated harness requires immediate replacement, which should be realized without the aid of special tools. Therefore, according to another feature of the present invention, the traction member may be constructed for detachable connection to the belt straps of the lap belt. The coupling of the traction member with the lap belt straps should hereby be configured to prevent inadvertent activation, while still being able to allow the coupling zones to easily slide also across edges of seat cushions without causing damage.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic perspective illustration of a position securing system according to the present invention for restraining an occupant in a land vehicle or aeronautical vehicle;

FIG. 2 is a detailed illustration of a variation of a hand-operated control mechanism for use in the position securing system of FIG. 1;

DETAILED DESCRIPTION OF PREFERRED EMBODIMENTS

Figure 3:
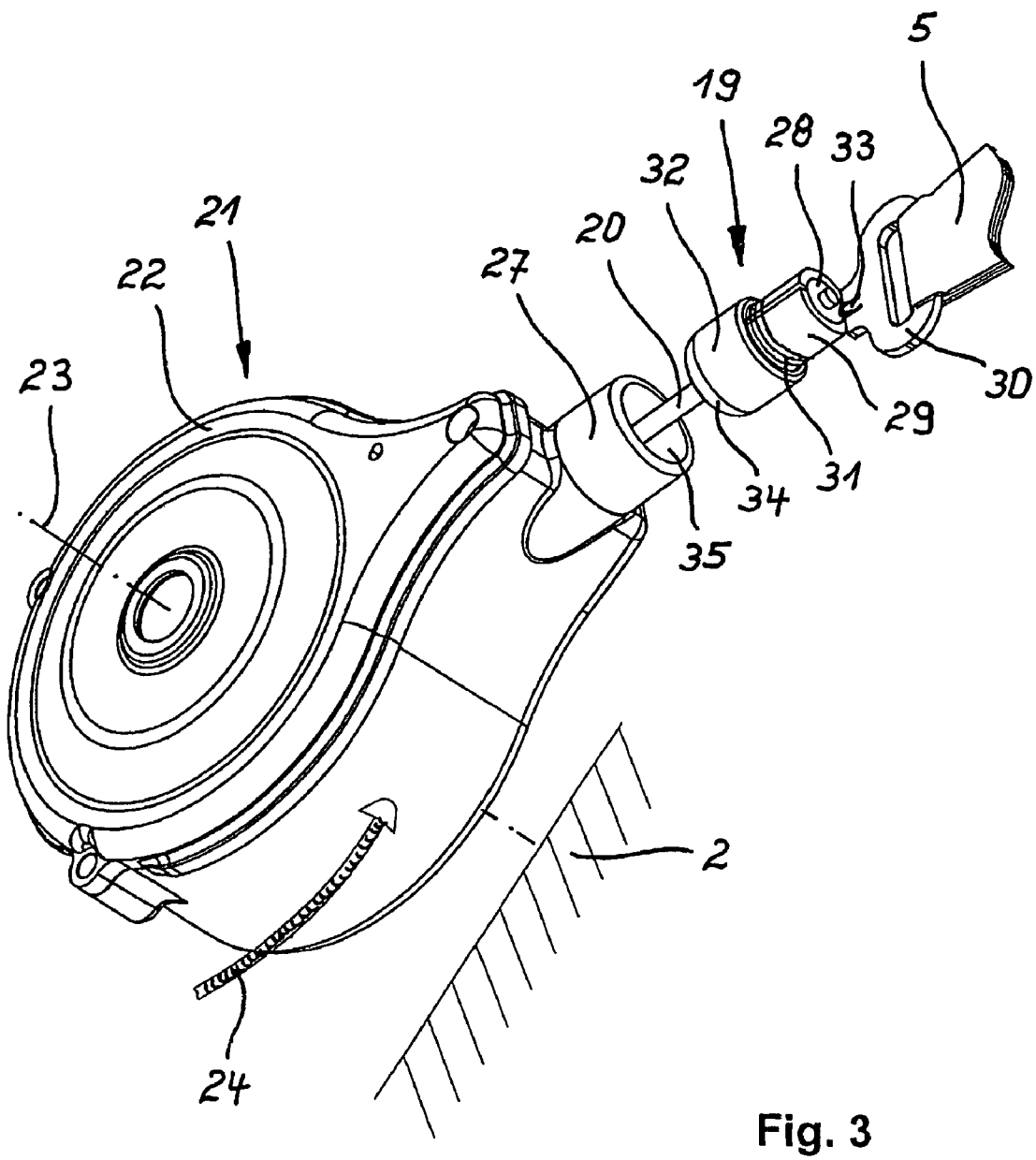
FIG. 3 is an enlarged detailed perspective view of an area of the position securing system encircled in FIG. 1 and marked III.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic perspective illustration of a position securing system according to the present invention, generally designated by reference numeral 1, for restraining an occupant in the seated and standing positions and during shift between the seated and standing positions in a land vehicle or aeronautical vehicle 2, such as, e.g., an ambulance or a helicopter. For sake of simplicity, the following description relates in general to a vehicle 2.

The position securing system 1 includes a harness 3 which is comprised of a lap belt 4 with two lap belt straps 5, two leg loops 6, a rear belt 7, two shoulder belts 8, a Y-shaped back belt 9, and a belly-side center buckle 10 as closure. The lap belt straps 5 and the shoulder belts 8 have each their own latchplate 11 for connection to the buckle 10. The leg loops 6 have one end fixed to the lap belt straps 5 and are formed with a latching tongue 12 which slides into the buckle 10. The rear belt 7 is also fixed to the lap belt straps 5 in the area of attachment of the leg loops 6.

The shoulder laps 8 converge in an area of a tether strap 13 and are connected thereto. The back belt 9 has one end connected to the rear belt 7 and is formed with two upper length portions 14 for connection to the shoulder belts 8, respectively. The tether strap 13 is connected via a releasable loop adjuster 15 with a strap 16 of an emergency locking retractor (ELR) 17 which has a housing 18 articulated to the vehicle 2.

The lap belt straps 5 are connected via releasable couplings 19 with traction members 20 in the form of cables. The traction members 20 form components of multiple function retractors (MFR) 21. Each multiple function retractor 21 has a housing 22 which is mounted to the vehicle 2 and swingable about an axis 23 in a manner not shown in detail. Bowden cables 24 connect each emergency locking retractor 17 and each multiple function retractor 21 to a control mechanism 25 which includes a hand lever 26. The hand lever 26 can be shifted between three operating modes I, II and III, namely neutral position I, release position II, and locking position III, as will be described furtherbelow.

The coupling 19 between each lap belt strap 5 and the traction member 20 of a multiple function retractor 21 is shown in more detail in FIG. 3 which is an enlarged detailed perspective view of an area encircled in FIG. 1 and marked III. As the multiple function retractors 21 for the lap belt straps 5 are of an identical construction, the following description is made only in relation to the multiple function retractor 21 one the left-hand side of the harness 3 in FIG. 3 for convenience and sake of simplicity, but the description is, of course, equally applicable to the other multiple function retractor 21.

The housing 22 of the multiple function retractor 21 includes a sleeve-like cable runout 27, whereby the traction member 20 exiting the cable runout 27 has an end inserted in a grommet 28. The grommet 28 is surrounded by a tubular portion 29 of a metallic carrier 30 which is connected to one end of the lap belt strap 5. The tubular portion 29 is provided with an outer thread 31 for attachment of a clamping nut 32 to connect the tubular portion 29 onto the grommet 28 and to thereby secure the traction member 20 in the grommet 28. A protrusion 33 formed on the carrier 30 prevents the grommet 28 for moving in an axial direction. In confronting relationship to the cable runout 27, the clamping nut 32 has an end 34 of rounded configuration so that in the even of contacting e.g. a seat cushion, the clamping nut 32 is prevented from hooking on or causing damage. The cable runout 27 has an interior 35 which is constructed to complement the rounded configuration of the clamping nut 32.

Figure 4:
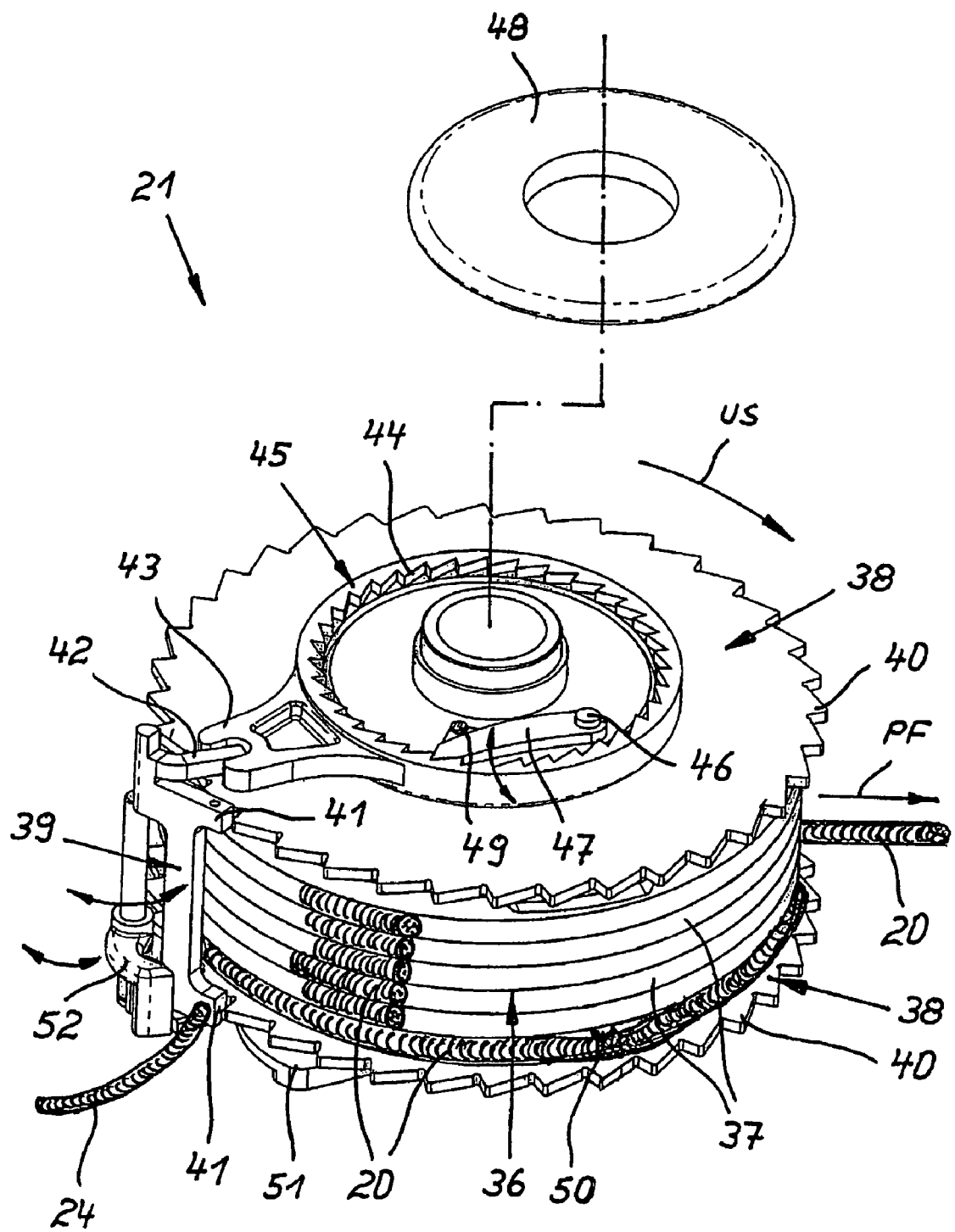
FIG. 4 is a schematic perspective illustration of a retractor for use in the position securing system of FIG. 1, partly broken up to show internal components of the retractor.

Each multiple function retractor 21, shown in FIGS. 1 and 3, is illustrated in more detail in FIG. 4 and includes a spring-assisted rotatable winding drum or bobbin 36 formed with a circumferential helical cable groove 37 which is rounded in cross section and constructed to complement the cross section of the traction member 20. The cable groove 37 has a pitch which is sized to correspond to the diameter of the traction member 20. The traction member 20 is wound onto the winding drum 36 from top to bottom in opposition to the clockwise direction of arrow US, as viewed in the drawing plane, and pays out in the drawing plane to the right, as shown by arrow PF.

Disposed on each of both sides of the winding drum 36 is a toothed disk or ratchet 38 which interacts with a detent pawl 39. The detent pawl 39 is swingably mounted to the housing 22 of the multiple function retractor 21 in opposition to an unillustrated spring and has detents 41 for engagement in teeth 40 of the ratchets 38. The teeth 40 and the detents 41 of the detent pawl 39 are hereby so constructed and arranged as to prevent a rotation of the winding drum 36 clockwise in the direction of arrow US in the drawing, when the detents 41 engage the teeth 40.

The detent pawl 39 is provided with a return lever 42 which is directed radially inwards and embraced by an engagement fork 43. The engagement fork 43 forms part of a control ring 45 having inner teeth 44. Disposed inside the control ring 45 is a locking pawl 47 which is swingable about an axis 46 and intended for interaction with the inner teeth 44 of the control ring 45. The locking pawl 47 rotates jointly with the winding drum 36. The inner teeth 44 of the control ring 45 are configured to prevent a rotation of the control ring 45 counterclockwise (in the direction opposite to arrow US), when the locking pawl 47 engages the teeth 44.

The multiple function retractor 21 further includes a disk-shaped inertial mass 48 having an underside formed with a pin 49 by which the locking pawl 47 can be moved into engagement with the teeth 44 of the control ring 45, as will be described hereinafter. For ease of illustration, FIG. 4 shows the pin 49 separate from the inertial mass 48.

Disposed in the area of the last winding, i.e. the lowermost winding in FIG. 4, of the cable groove 37 is a tracer pin 50 which is operatively connected to a pivot lever 52 via a lever assembly 51 which is not shown in greater detail. When the last winding of the cable groove 37 receives the traction member 20 during reel-in operation, the tracer pin 50 shifts inwardly as a result of the radial force applied by the traction member 20 to turn the pivot lever 52 via the lever assembly 51 in such a way as to move the detent pawl 39 into locking engagement with the ratchet teeth 40. As a consequence, the traction member 20 can no longer be drawn out. It is only possible to take in the remainder of the traction member 20.

The mode of operation of the position securing system 1 is as follows: When a seated occupant strapped by the harness 3 to a seat shifts the hand lever 26 from the neutral position I to the release position II, the Bowden cables 24 disengage the winding drums 36 in both multiple function retractors 21 and also disengage the unillustrated winding drum of the emergency locking retractor 17. In other words, the detent pawls 39 are moved out of engagement with the teeth 40 of the ratchets 38. As a result, the winding drums 36 are freely rotatable in opposition to the return force of their unillustrated springs. In this stage, the retractors 21 operate in emergency locking mode and the occupant is able to stand up from the seated position.

By keeping the hand lever 26 in the release position II, the occupant is able to freely position himself or herself. Springs in the multiple function retractors 21 and the emergency locking retractor 17 maintain the traction members 20 taut. When released, the hand lever 26 spontaneously returns to neutral position I and the detent pawls 39 engage the teeth 40 again so that the retractors 21 operate in automatic locking mode.

When the occupant is exposed to a sudden excessive deceleration or acceleration caused by an abrupt movement of the vehicle 2, accompanied by a load on the traction member 20 in length direction, the inertial mass 48 remains in position, while the winding drum 36 continues to rotate as the traction member 20 is drawn out. As a result of the continued rotation of the winding drum 36, the pin 49 on the inertial mass 48 comes into contact with the locking pawl 47, which rotates jointly with the winding drum 36, to shift the locking pawl 47 into engagement with the teeth 44 of the control ring 45. As a result, the control ring 45 rotates as well and pivots the return lever 42 via the engagement fork 43 so that the detents 41 of the detent pawl 39 engage the teeth 40 of the ratchets 38. Further pay out of the traction member 20 is prevented.

A shift of the hand lever 26 into the locking position III causes the detent pawl 39 to instantly engage the teeth 40 of the ratchets 38 so as to inhibit any rotation of the winding drums 36 in payout direction PF.

Turning now to FIG. 2, there is shown a detailed illustration of a variation of a hand-operated control mechanism 25a for use in the position securing system 1. The control mechanism 25a includes two hand levers 53, 54, whereby the hand lever 35 is provided to change between the neutral position I and the release position II, whereas the hand lever 54 is provided to change between the neutral position I and the locking position III.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A position securing system for restraining in a land or aeronautical vehicle an occupant who alternates between seated and standing positions, comprising:

a harness attached to an occupant's body and including a two-part lap belt defining two lap belt straps, two leg loops, a rear belt, two shoulder belts, a back belt, and a belly-side center buckle; and a plurality of retractors connectable to the vehicle and interacting with the shoulder belts and the belt straps of the lap belt in one-to-one correspondence, wherein at least the retractors interacting with the lap belt straps are each constructed to include a winding drum for winding in a reel-in direction a traction member which is integrated in the lap belt strap, said winding drum being loaded by a spring in the reel-in direction, a locking mechanism for barring rotation of the winding drum at least in a pay-out direction of the traction member, when the occupant assumes a seated position, a hand-operated control mechanism for disengaging the locking mechanism to allow the winding drum to freely rotate so that the occupant is able to move between the seated and standing positions, a pay-out lock operatively connected to the winding drum and constructed to act upon the winding drum in response to a sensed acceleration above a predefined level, wherein the control mechanism and the pay-out lock are so operatively connected to the locking mechanism that the winding drum is lockable in position by either the control mechanism or by the pay-out lock, when the occupant assumes the standing position.

2. The position securing system of claim 1, wherein the traction member is helically wrapped about the winding drum.

3. The position securing system of claim 1, wherein the traction member is constructed as cable, said winding drum being constructed with a helical groove for receiving the cable, with the groove having a rounded cross section.

4. The position securing system of claim 1, wherein the locking mechanism includes at least one ratchet operatively connected to the winding drum, and a detent pawl swingably supported by a housing of the retractor in opposition to a return force of a spring and interacting with the ratchet.

5. The position securing system of claim 4, further comprising a pull member connecting the detent pawl to the control mechanism.

6. The position securing system of claim 4, wherein the pay-out lock includes a toothed control ring, a locking pawl disposed inside the control ring and rotating conjointly with the winding drum, and an inertial mass, said detent pawl having a return lever which is operatively connected via the locking pawl with the control ring in response to an interaction between the inertial mass and the locking pawl, when the traction member is accelerated above a predefined level.

7. The position securing system of claim 6, wherein the control ring has an inner toothed surface.

8. The position securing system of claim 6, wherein the inertial mass is formed on its side confronting the control ring with a pin by which the locking pawl can be brought into engagement with the control ring to cause the detent pawl to engage the ratchet, when the traction member is accelerated above a predefined level.

9. The position securing system of claim 6, wherein the control ring includes an engagement fork embracing the return lever 10. The position securing system of claim 4, further comprising a tracer pin arranged in an area of a last turn of the traction member on the winding drum and constructed to act on the detent pawl via a lever assembly.

11. The position securing system of claim 1, wherein the control mechanism has a hand lever shiftable between a neutral position and a locking position, in which the locking mechanism is locked, and between the neutral position and a release position, in which the locking mechanism is released, said hand lever being connected by a Bowden cable to the pay-out lock.

12. The position securing system of claim 1, wherein the control mechanism has two hand levers, each shiftable between a locking position, in which the locking mechanism is locked, and a release position, in which the locking mechanism is released, each said hand lever being connected by a Bowden cable to the pay-out lock.

13. The position securing system of claim 1, wherein the traction member is constructed for detachable connection to the belt strap of the lap belt.

* * * * *